United States Patent
Hong et al.

(10) Patent No.: US 12,401,791 B2
(45) Date of Patent: Aug. 26, 2025

(54) METHOD FOR GENERATING PREDICTION BLOCK BY USING WEIGHTED-SUM OF INTRA PREDICTION SIGNAL AND INTER PREDICTION SIGNAL, AND DEVICE USING SAME

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Myung Oh Hong, Gwangmyeong-si (KR); Joo Hyung Byeon, Seoul (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/233,228

(22) Filed: Aug. 11, 2023

(65) Prior Publication Data
US 2023/0388494 A1     Nov. 30, 2023

Related U.S. Application Data

(63) Continuation of application No. PCT/KR2022/002466, filed on Feb. 18, 2022.

(30) Foreign Application Priority Data

Feb. 18, 2021   (KR) .................. 10-2021-0021933
Mar. 9, 2021    (KR) .................. 10-2021-0030849
Feb. 18, 2022   (KR) .................. 10-2022-0021605

(51) Int. Cl.
*H04N 19/119*     (2014.01)
*H04N 19/105*     (2014.01)
(Continued)

(52) U.S. Cl.
CPC ......... *H04N 19/119* (2014.11); *H04N 19/105* (2014.11); *H04N 19/132* (2014.11); *H04N 19/176* (2014.11); *H04N 19/70* (2014.11)

(58) Field of Classification Search
CPC ...... H04N 19/11; H04N 19/132; H04N 19/70; H04N 19/109; H04N 19/593;
(Continued)

(56) References Cited

U.S. PATENT DOCUMENTS 10,165,283 B1    12/2018  Chen et al.
10,666,940 B2    5/2020   Park et al.
(Continued)

FOREIGN PATENT DOCUMENTS

KR    20170084055 A    7/2017
WO    2020187329 A1    9/2020

OTHER PUBLICATIONS

B Bross et al., Versatile Video Coding Editorial Refinements on Draft 10, Joint Video Experts Team (JVET) of ITU-T SG 16 WP 3 and ISO/IEC JTC 1/SC 29; Document: JVET-T2001-v2; 2020.11.24; pp. 1-511.
(Continued)

*Primary Examiner* — Neil R Mikeska
(74) *Attorney, Agent, or Firm* — Lempia Summerfield Katz LLC

(57) ABSTRACT

A method of generating a prediction block and a device using same use a weighted-sum of an intra-prediction signal and an inter-prediction signal. The method includes: deter-
(Continued)

mining that a current block of the video data is to be encoded in a weighted-sum prediction mode; splitting the current block into two or more subblocks; determining, for each of the subblocks, a weight set including a first weight for an intra-prediction signal of the current block and a second weight for an inter-prediction signal of the current block, the subblocks having different weight sets; and determining a prediction block of the current block based on a weighted-sum of the intra-prediction signal and the inter-prediction signal, the weighted-sum being dependent on the weight set that is determined for each of the subblocks.

18 Claims, 17 Drawing Sheets

(51) Int. Cl.
*H04N 19/132* (2014.01)
*H04N 19/176* (2014.01)
*H04N 19/70* (2014.01)

(58) Field of Classification Search
CPC .. H04N 19/105; H04N 19/176; H04N 19/119; H04N 19/96
See application file for complete search history.

(56) References Cited

U.S. PATENT DOCUMENTS

| | | | |
|---|---|---|---|
| 11,330,257 | B2 | 5/2022 | Liu et al. |
| 11,425,406 | B2 | 8/2022 | Liu et al. |
| 2018/0160113 | A1* | 6/2018 | Jeong ................... H04N 19/105 |
| 2018/0288410 | A1 | 10/2018 | Park et al. |
| 2020/0221099 | A1* | 7/2020 | Pham Van ........... H04N 19/176 |
| 2020/0366900 | A1* | 11/2020 | Jun ........................ H04N 19/11 |
| 2020/0413047 | A1* | 12/2020 | Li .......................... H04N 19/107 |
| 2021/0006786 | A1* | 1/2021 | Gao ..................... H04N 19/176 |
| 2021/0127110 | A1* | 4/2021 | Filippov .............. H04N 19/176 |
| 2021/0127140 | A1* | 4/2021 | Hannuksela ........... G06N 3/084 |
| 2021/0274167 | A1 | 9/2021 | Liu et al. |
| 2022/0070483 | A1 | 3/2022 | Liu et al. |
| 2022/0124349 | A1 | 4/2022 | Liu et al. |
| 2022/0272359 | A1* | 8/2022 | Liao ..................... H04N 19/186 |

OTHER PUBLICATIONS

International Search Report and Written Opinion cited in corresponding PCT application No. PCT/KR2022/002466; May 31, 2022; 11 pp.
J Chen et al., Algorithm description for Versatile Video Coding and Test Model 11 (VTM 11), Joint Video Experts Team (JVET) of ITU-T SG 16 WP 3 and ISO/IEC JTC 1/SC 29; Document: JVET-T2002-v2; Jan. 5, 2021; pp. 1-101.

* cited by examiner (a)

(b)

(a)

(b)

(c)

(d)

| LeftTop | Top1 | Top2 |
|---|---|---|
| Left1 | Subblock1 | |
| Left2 | Subblock2 $w = (a_k, b_k)$ | |

METHOD FOR GENERATING PREDICTION BLOCK BY USING WEIGHTED-SUM OF INTRA PREDICTION SIGNAL AND INTER PREDICTION SIGNAL, AND DEVICE USING SAME

CROSS-REFERENCE TO RELATED APPLICATIONS

This application is a continuation of International Application No. PCT/KR2022/002466, filed on Feb. 18, 2022, which claims priority to Korean Patent Application No. 10-2021-0021933 filed on Feb. 18, 2021, Korean Patent Application No. filed on Mar. 9, 2021, and Korean Patent Application No. 10-2022-0021605 filed on Feb. 18, 2022, the disclosures of which are incorporated by reference herein in their entirety.

TECHNICAL FIELD

The present disclosure relates to a method of generating a prediction block by using a weighted-sum of an intra-prediction signal and an inter-prediction signal, and a device using the same.

BACKGROUND

The statements in this section merely provide background information related to the present disclosure and do not necessarily constitute prior art.

Compared to voice data or still image data, a large amount of video data unprocessed or uncompressed requires a lot of hardware resources, including memory, to store or transmit in its original form.

Accordingly, when storing or transmitting video data, an encoder is typically used to compress the video data to store or transmit the video data, and a decoder receives the compressed video data and performs decompression and reconstruction thereof. Such video compression technologies include H.264/AVC, High Efficiency Video Coding (HEVC), and Versatile Video Coding (VVC), which improves the encoding efficiency of HEVC by about 30% or more.

However, due to the gradual increase in size, resolution, and frame rate of videos, and accordingly the increased amount of data that needs to be encoded, new compression technology is required to be more efficient in encoding and more effective in improving image quality than existing compression technologies.

Combined inter-intra prediction (CIIP) is a prediction mode introduced in the VVC, which generates a prediction block of a coding unit through a weight average between the predicted samples obtained by intra prediction and the predicted samples obtained by inter prediction, as shown in the following equation.

$$P_{CIIP} = ((4-w) * P_{Intra} + w * P_{inter}) \gg 2 \quad \text{Equation 1}$$

In Equation 1, $P_{intra}$ and $P_{inter}$ are the predicted samples obtained by intra prediction and inter prediction, respectively. The value of weight (w) depends on the prediction mode (A) of the top CU and the prediction mode (B) of the left CU and is determined to be one of 1, 2, or 3. If both A and B are intra predictions, then the weight value is 1, and $P_{CIIP}$ is, therefore, more influenced by intra predictions. If only one of A and B is an intra prediction and the other is an inter prediction, then the weight is 2. Finally, if both A and B are inter predictions, the weight is 3, so $P_{CIIP}$ is more influenced by inter predictions. Once the weight value is determined from the prediction mode of the neighboring blocks, a single weight value is used for the entire prediction block.

When generating the $P_{inter}$, the Merge mode (referred to as "regular Merge" in the VVC) is used, which is a method that utilizes motion vector information of the neighboring blocks as it is for a current block, and when generating the $P_{intra}$, a PLANAR mode is always used, regardless of the intra-prediction mode of the neighboring blocks. The PLANAR mode requires four (top/bottom/left/right) reference samples to predict a given sample in the prediction unit. Since the samples at the right and bottom positions are not yet available due to the encoding and decoding order, the four reference samples are filled by copying the values of the top-left and bottom-left samples to the right and bottom sample positions. This sample copying may result in relatively poorer prediction performance at the bottom-right area in the prediction unit, and as a result, the predicted samples at the bottom-right area in the prediction block generated by using the weight average by CIIP may be less accurate than the predicted samples in other areas.

SUMMARY

(a) Technical Problem

The present disclosure presents an improved method of generating a prediction block of a block of video data by using a weight sum of an intra-prediction signal and an inter-prediction signal. The method disclosed herein splits a given block into subblocks and applies different weights each to the subblocks.

(b) Technical Solution

The present disclosure in at least one embodiment provides a method of coding (i.e., encoding or decoding) video data. This method includes determining that a current block of the video data is to be coded in a weighted-sum prediction mode. The method further includes splitting the current block into two or more subblocks. The method further includes determining, for each of the subblocks, a weight set including a first weight for an intra-prediction signal of the current block and a second weight for an inter-prediction signal of the current block. The subblocks have different weight sets. The method further includes determining a prediction block of the current block based on a weighted-sum of the intra-prediction signal and the inter-prediction signal, wherein the weighted-sum is dependent on the weight set that is determined for each of the subblocks.

The present disclosure in another embodiment provides a computer-readable non-transitory recording medium recorded with a bitstream including encoded data of blocks of video data. The bitstream is configured to be generated by a method of encoding the video data and processed by a method of decoding the video data.

The present disclosure in yet another embodiment provides a device for coding video data, including a memory and a processor connected to the memory. The processor is configured to determine that a current block of the video data is to be encoded in a weighted-sum prediction mode and to split the current block into two or more subblocks. The processor is also configured to determine, for each of the subblocks, a weight set including a first weight for an intra-prediction signal of the current block and a second weight for an inter-prediction signal of the current block.

Here, the subblocks have different weight sets. The processor is further configured to determine a prediction block of the current block based on a weighted-sum of the intra-prediction signal and the inter-prediction signal. The weighted-sum is dependent on the weight set that is determined for each of the subblocks.

(c) Advantageous Effects

According to the methods and devices described above, prediction performance for blocks of video data is improved by providing flexibility over the CIIP mode of VVC without significantly increasing the computational complexity of the encoding process.

BRIEF DESCRIPTION OF THE DRAWINGS

FIG. 16 is a diagram illustrating an example in which the weights of at least one subblock are derived from decoded information of neighboring blocks of the current block, according to at least one aspect of the present disclosure.

DETAILED DESCRIPTION

Figure 1:
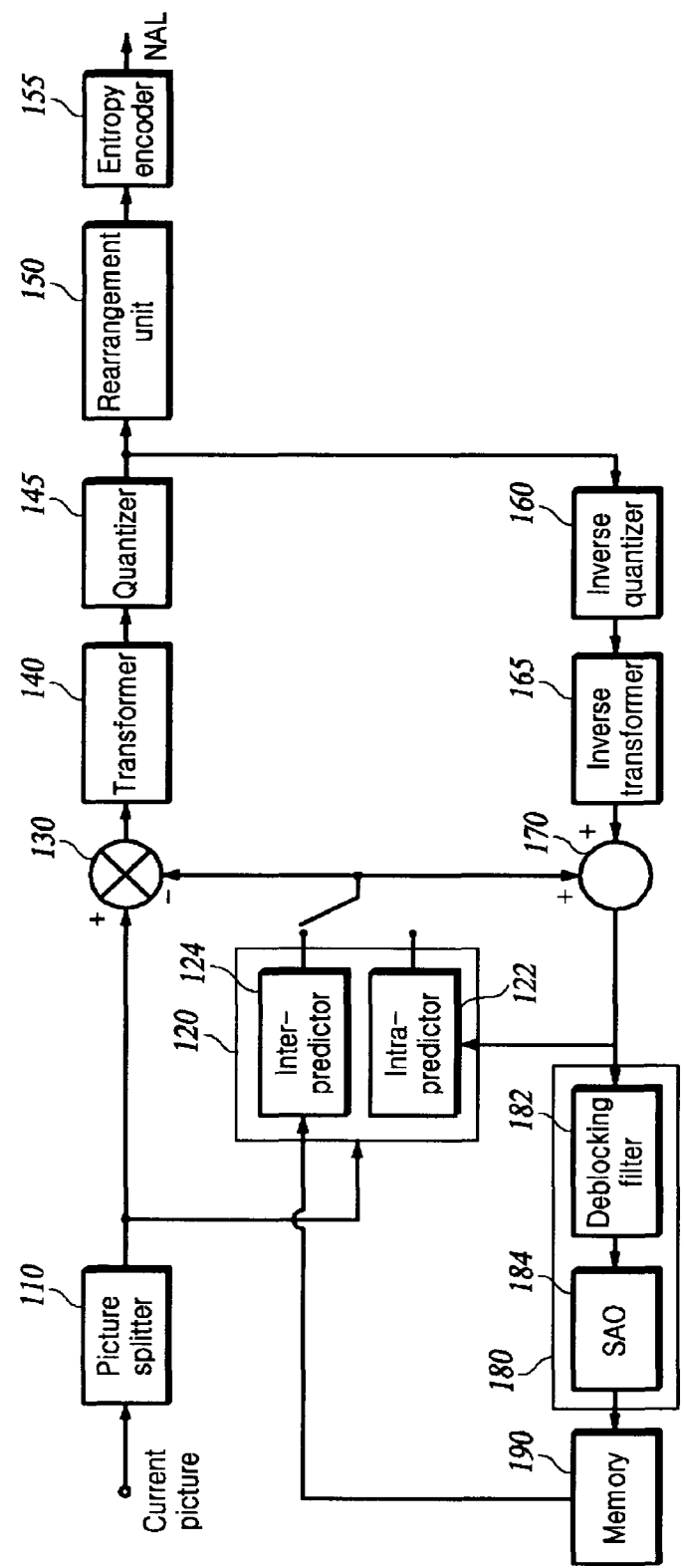
FIG. 1 is a block diagram illustrating a video encoding device capable of implementing the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions when considered to obscure the subject of the present disclosure has been omitted for the purpose of clarity and for brevity.

FIG. 1 is a block diagram for a video encoding device, which may implement technologies of the present disclosure. Hereinafter, referring to illustration of FIG. 1, the video encoding device and sub-components of the device are described.

The video encoding device may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding device may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding device.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may be a binarytree (BT) in which the higher node is split into two lower nodes. The tree structure may be a ternarytree (TT) in which the higher node is split into three lower nodes at a ratio of 1:2:1. The tree structure may be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
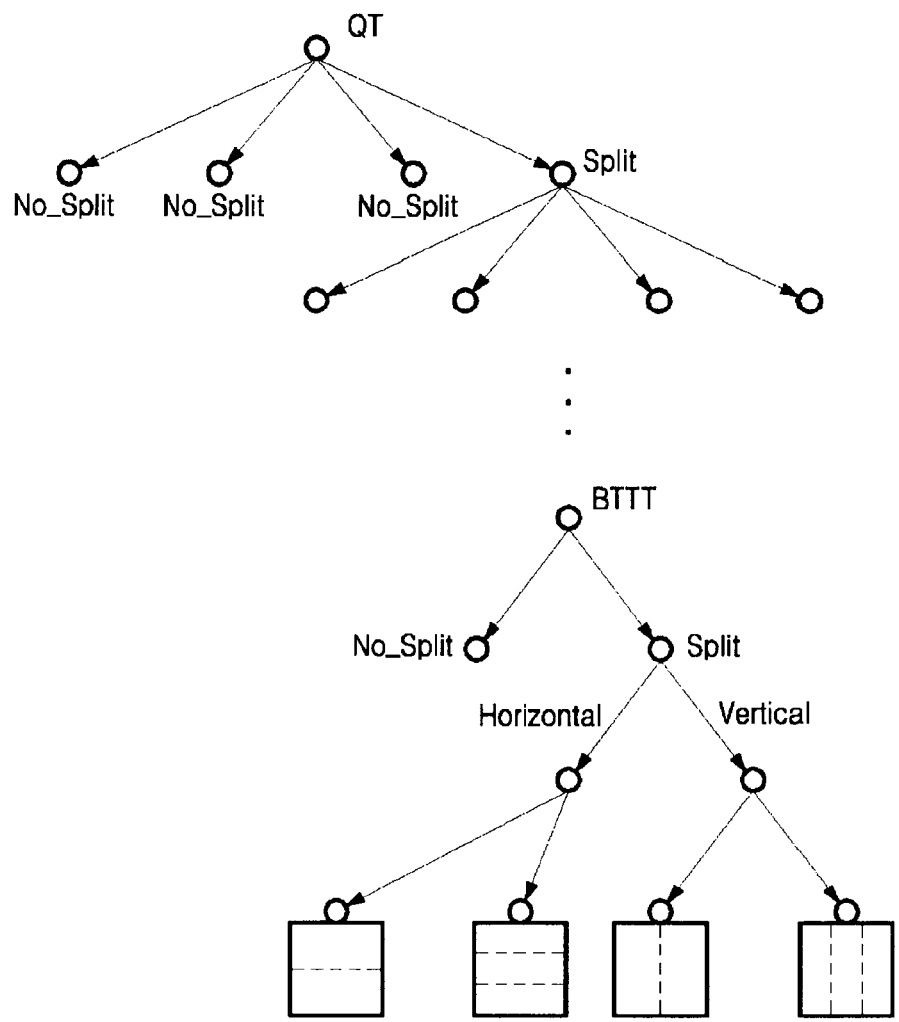
FIG. 2 is a diagram illustrating a method for partitioning a block by using a quadtree plus binarytree ternarytree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding device. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding device.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding device starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding device. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
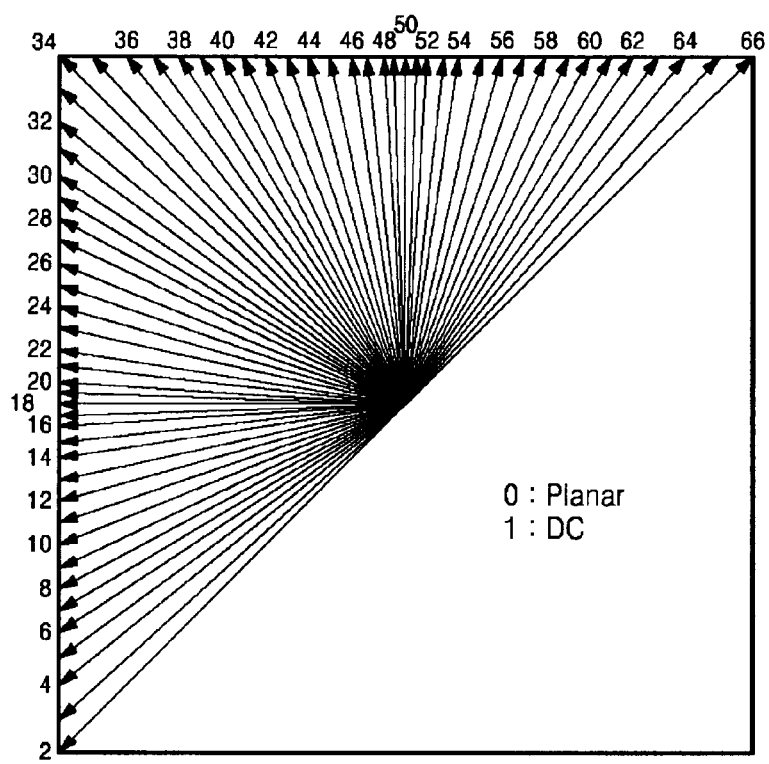
FIGS. 3A and 3B are diagrams illustrating a plurality of intra-prediction modes, including wide-angle intra-prediction modes.

The intra predictor 122 predicts pixels in the current block by using pixels (reference pixels) positioned on a neighboring of the current block in the current picture including the current block. There is a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
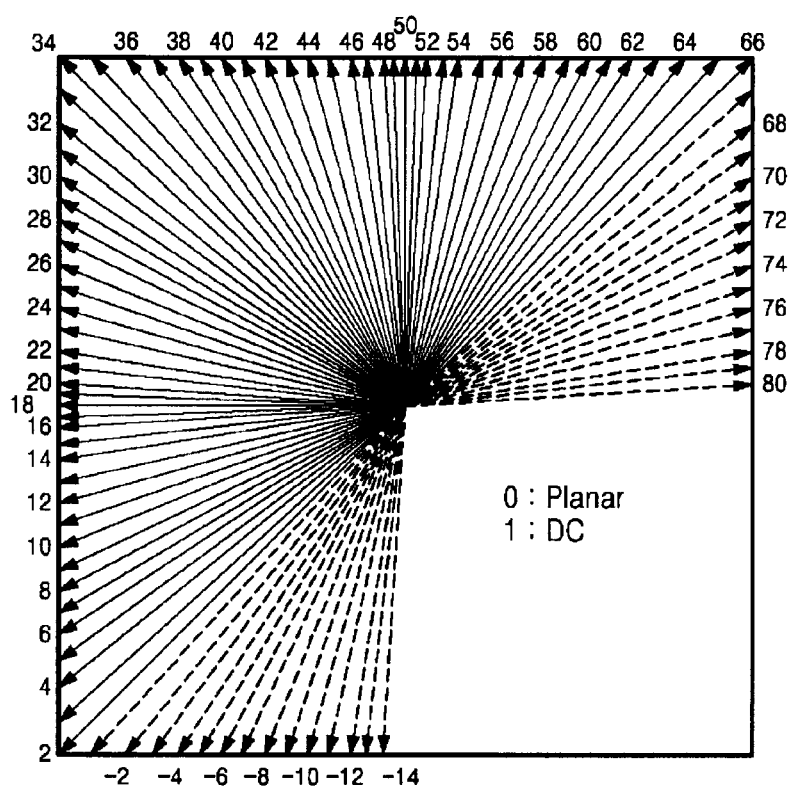

For efficient directional prediction for the current block having the rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding device.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding device.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding device. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
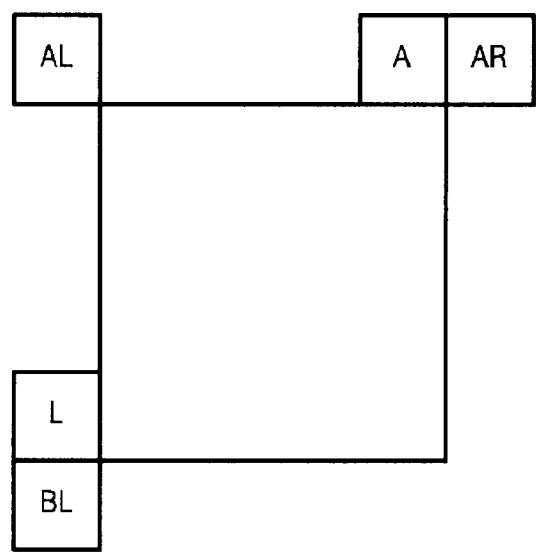
FIG. 4 a diagram illustrating neighbor blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding device.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding device also knows the pre-defined function. Further, since the neighboring block used for deriving the motion vector predictor candidate is a block in which encoding and decoding are already completed, the video decoding device may also already know the motion vector of the neighboring block. Therefore, the video encoding device does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding device. Further, a size of the transform area sub-block may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding device.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding device.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding device.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding device to split the block equally to the video encoding device. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block are used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the reconstructed pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding device.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
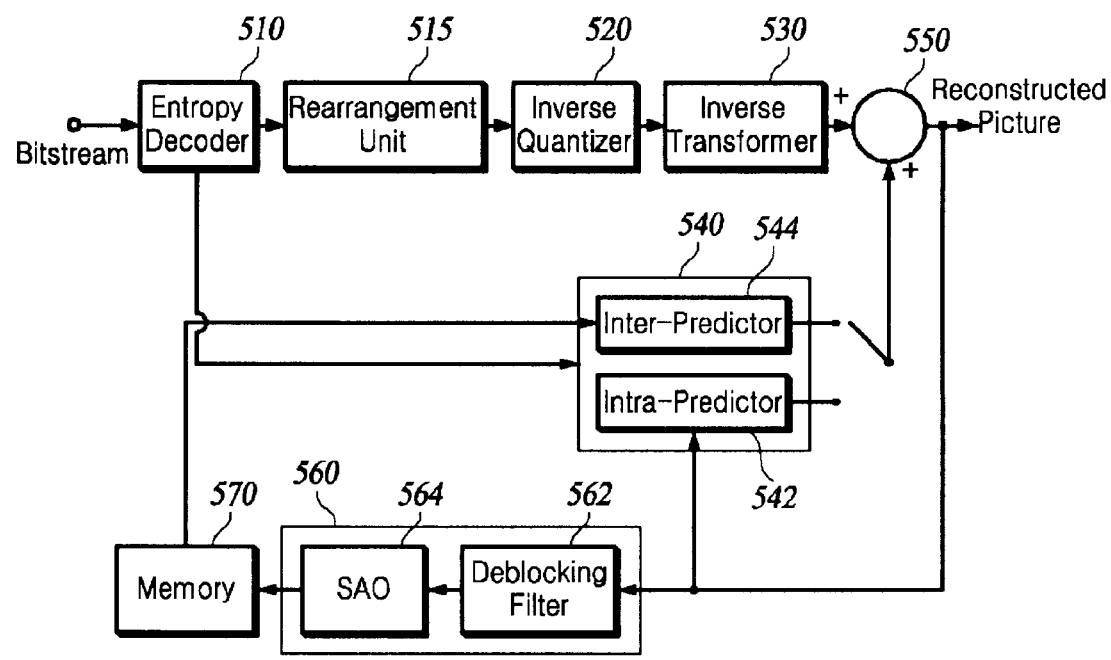
FIG. 5 is a block diagram illustrating a video decoding device capable of implementing the techniques of the present disclosure.

FIG. 5 is a functional block diagram for a video decoding device, which may implement the technologies of the present disclosure. Hereinafter, referring to FIG. 5, the video decoding device and sub-components of the device are described.

The video decoding device may be configured to include an entropy decoder 510, a rearrangement unit 515, an inverse quantizer 520, an inverse transformer 530, a predictor 540, an adder 550, a loop filter unit 560, and a memory 570.

Similar to the video encoding device of FIG. 1, each component of the video decoding device may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding device to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding device.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding device to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_jdx) signaled from the video encoding device. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer and the prediction block output from the inter predictor or the intra predictor. Pixels within the reconstructed current block are used as a reference pixel upon intra predicting a block to be decoded afterwards.

The loop filter unit 560 as an in-loop filter may include a deblocking filter 562, a SAO filter 564, and an ALF 566. The deblocking filter 562 performs deblocking filtering a boundary between the reconstructed blocks in order to remove the blocking artifact, which occurs due to decoding on a per-block basis. The SAO filter 564 and the ALF 566 perform additional filtering for the reconstructed block after the deblocking filtering in order to compensate a difference between the reconstructed pixel and an original pixel, which occurs due to lossy coding. The filter coefficients of the ALF are determined by using the information on the filter coefficients decoded from the bitstream.

The reconstructed blocks filtered through the deblocking filter 562, the SAO filter 564, and the ALF 566 are stored in the memory 570. Once all blocks in one picture have been reconstructed, the reconstructed picture may be used as a reference picture for inter predicting blocks within a picture to be encoded afterwards.

The techniques of the present disclosure generally relate to generating a prediction block of a block of video data, and more specifically, to an improved method for generating a prediction block of a block of video data by using a weighted-sum (or weighted-average) of an intra-prediction signal and an inter-prediction signal. Accordingly, the techniques of the present disclosure may be performed by the predictor 120 of the video encoding device illustrated in FIG. 1 or the predictor 540 of the video decoding device illustrated in FIG. 5. Further, one or more other units of the video encoding device or video decoding device may additionally engage in performing the techniques of the present disclosure.

The description below focuses primarily on the decoding process, i.e., the operation of a video decoder that may be implemented with the video decoding device illustrated in FIG. 5. The description of the encoding process is simplified as it is the opposite of the decoding process, which is described comprehensively.

Figure 6:
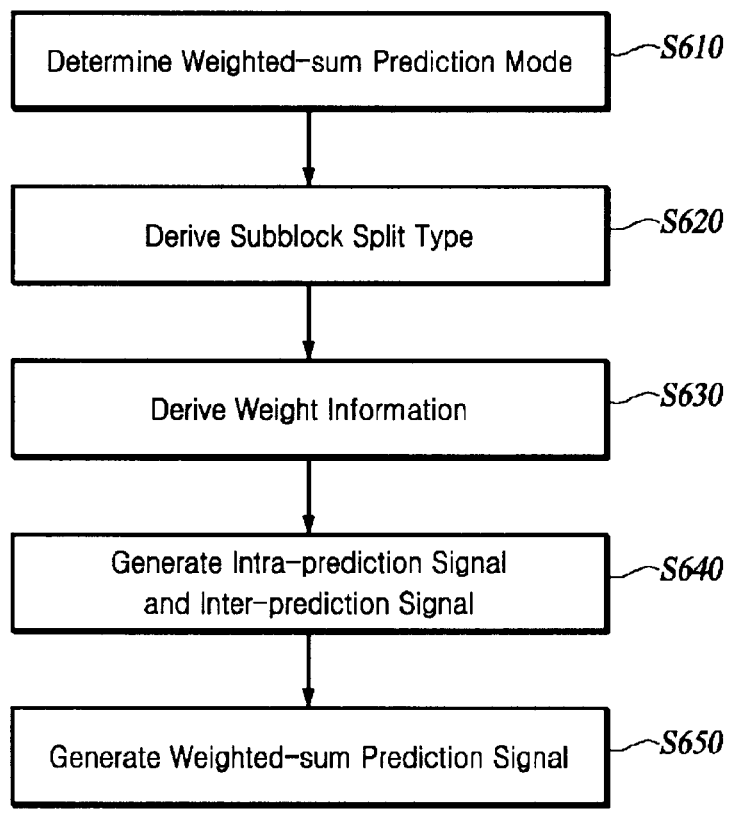
FIG. 6 is a flowchart illustrating a method of generating a prediction block by using a weight sum of an intra-prediction signal and an inter-prediction signal, according to at least one aspect of the present disclosure.
Figure 7:
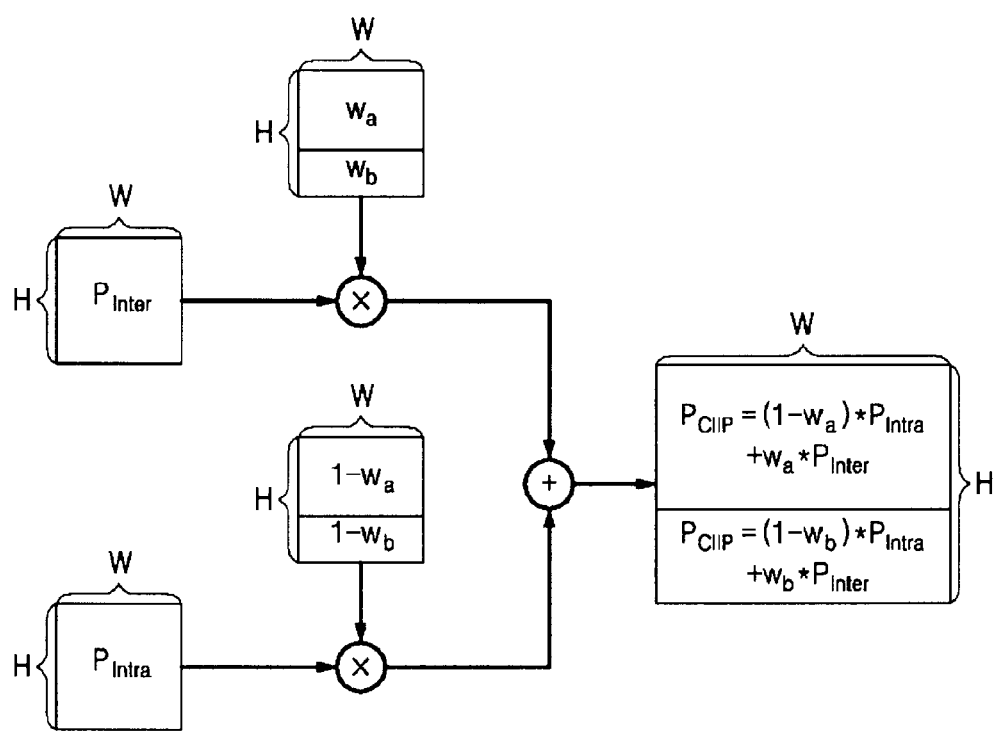
FIG. 7 is a conceptual diagram illustrating a method of generating a prediction block by using a weight sum of an intra-prediction signal and an inter-prediction signal, according to at least one aspect of the present disclosure.

FIGS. 6 and 7 are a flowchart and a conceptual diagram respectively, illustrating a method of generating a prediction block by using a weight sum of an intra-prediction signal and an inter-prediction signal, according to at least one aspect of the present disclosure.

The present disclosure introduces a weighted-sum prediction mode in which, when generating a weighted-sum prediction signal from an intra-prediction signal and an inter-prediction signal for a given block, the given block is split into subblocks and a different pair of weights is applied to each subblock. In other words, when generating the weighted-sum prediction signal, the pair of weights for the first subblock of the given block is different from that for the second subblock of the given block. FIG. 7 illustrates a case where a given block is split horizontally into two subblocks, and as discussed below, blocks coded in a weighted-sum prediction mode may be split in various ways.

The flowchart shown in FIG. 6 is a method performed by a video decoder, which may be configured to include steps of 1) determining a weighted-sum prediction mode, 2) deriving a subblock split type, 3) deriving weight information, 4) generating an intra-prediction signal and an inter-prediction signal, and 5) generating a weighted-sum prediction signal. It should be understood that the respective steps illustrated in FIG. 6 may be performed by changing the sequence thereof or by performing two or more of the steps in parallel. For example, the deriving of the weight information and the generating of the intra-prediction signal and inter-prediction signal may be reversed in order.

Determining Weighted-sum Prediction Mode (S610)

The video decoder may determine whether the weighted-sum prediction mode is applied for the current block of video data. For example, the video encoder may signal a syntax element (e.g., a 1-bit flag) in the bitstream indicating whether the weighted-sum prediction mode is applied for the current block, and the video decoder may parse the syntax element from the bitstream to determine whether the weighted-sum prediction mode is applied for the current block.

Deriving Subblock Split Type (S620)

As described above, in the weighted-sum prediction mode described herein, various split types may be available for splitting a given block. The video decoder may determine, among the available split types, the split type selected by the video encoder for the current block.

Information indicating the selected split type for the current block (e.g., an index of the selected split type) may be explicitly signaled in the bitstream by the video encoder. Alternatively, the split type for the current block may be determined (or derived) by the video encoder and the video decoder based on the size (e.g., width and height) of the current block, or based on the intra-prediction mode of the current block, or from decoded information of already reconstructed neighboring blocks adjacent to the current block.

Figure 8:
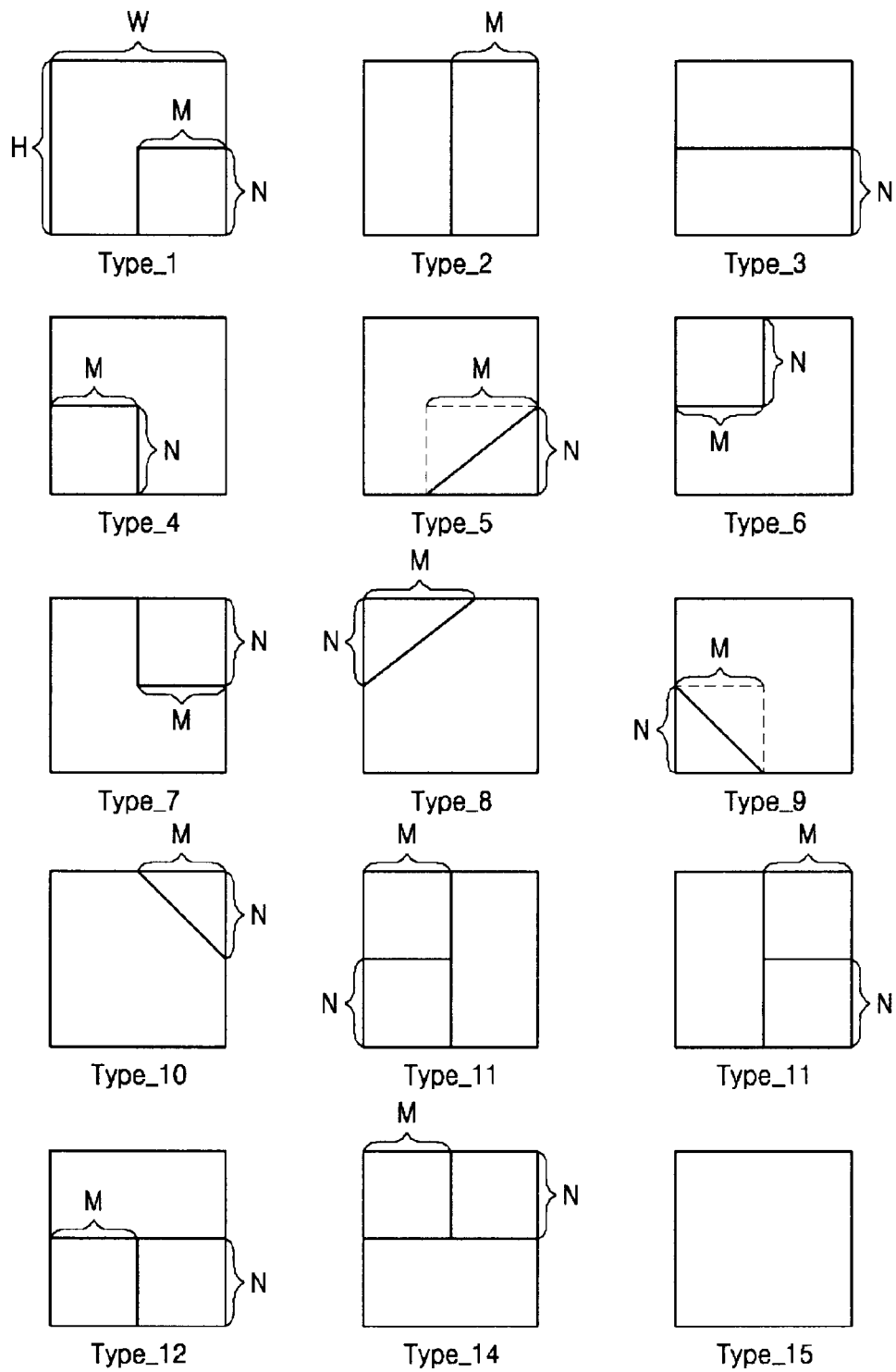
FIG. 8 illustrates subblock partition types that may be utilized in a weighted-sum prediction mode, according to at least one aspect of the present disclosure.

FIG. 8 illustrates subblock partition types that may be utilized in a weighted-sum prediction mode, according to at least one aspect of the present disclosure. A person of ordinary skill in the art should recognize that in the weighted-sum prediction mode involving splitting into subblocks, fewer or more split types may be utilized than those illustrated in FIG. 8. A person of ordinary skill in the art should also recognize that other split types may be utilized with different shapes and/or different numbers of subblocks than the split types illustrated in FIG. 8.

As recognized by the split types illustrated in FIG. 8, the current block corresponding to the coding unit may be split into two or more subblocks. In Types_1 through Type_10, the current block is divided into two subblocks, and in Types_11 through Type_14, the current block is divided into three subblocks. Type_15 represents the NO_SPLIT type. When Type_15 is used, the weighted-sum prediction signal is generated without splitting the current block into subblocks (similar to the CIIP mode of VVC). So, when Type_15 is used, a single weight set is used for the entire current block.

Figure 9:
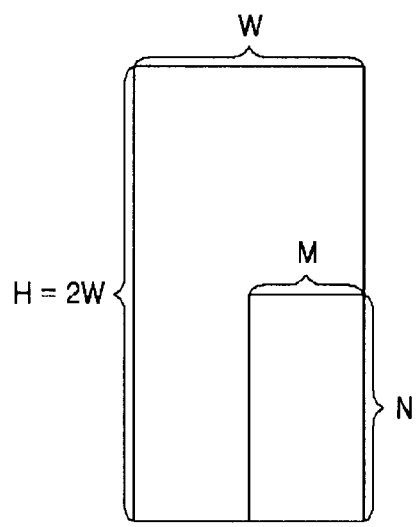
FIG. 9 illustrates applications of Type_1 illustrated in FIG. 8 to a non-square block with H=2W and a non-square block with 4H=W.
Figure 9:
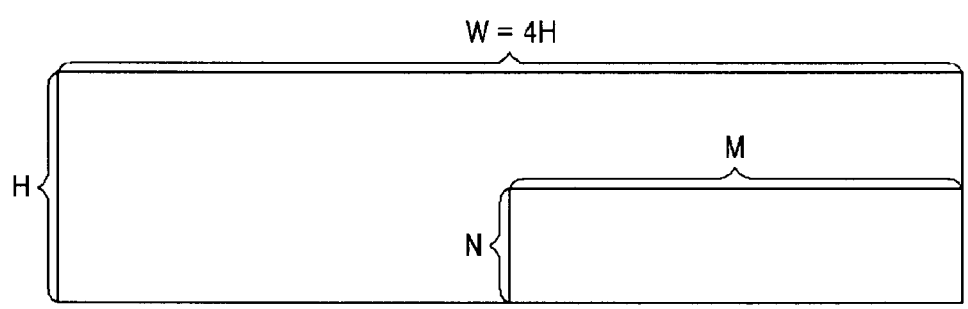

In the split types shown in FIG. 8, W and H are the width and height of the current block (or the prediction block of the current block), respectively, and M and N may be predefined between the video encoder and video decoder in relation to W and H. For example, M is W/2 and N is W/2. For example, M may be W/2 and N may be H/2 or M may be W/4 and N may be H/4, or M may be W/2 and N may be H/4 or M may be W/4 and N may be H/2. FIG. 9 is an example of Type_1 illustrated in FIG. 8 as applied to a nonsquare block with H=2W and a nonsquare block with 4H=W. In the example of FIG. 9, N=2M in the H=2W non-rectangular block, and 4N=M in the 4H=W nonsquare block.

Depending on the size (e.g., width/height/proportion, etc.) of the target block to be predicted in the weighted-sum prediction mode, some of the available split types for blocks of video data may not be allowed to be used for the target block. For example, when the target block is a horizontally elongated rectangle, Type_2 illustrated in FIG. 8, which splits vertically, may not be allowed to be used for the target block.

For the purpose of reducing the complexity of the video encoder, the weighted-sum prediction mode of the present disclosure may be composed of a first mode in which blocks are split only by a particular split type (e.g., Type_1 in FIG. 8) and a second mode in which a single weight is used for the entire block without splitting into subblocks (e.g., Type_15 in FIG. 8). Further, only one split type (e.g., Type_1 of FIG. 8) may be allowed for blocks of video data coded in the weighted-sum prediction mode.

As discussed below, the present disclosure may use, as well as PLANAR mode, various modes illustrated in FIG. 3A, such as horizontal mode, vertical mode, diagonal mode, and the like to generate the intra-prediction signal. The intra-prediction signal is one of the two types of prediction signals required to generate the weighted-sum prediction signal of the current block. In such cases, the split type to be applied for the current block may be inferred directly from the intra-prediction mode of the current block.

For example, the video encoder and video decoder may infer that: if the current block is in PLANAR mode, the current block is split into Type_1 of FIG. 8; if the current block is in horizontal mode, the current block is split into Type_2 of FIG. 8; if the current block is in vertical mode, the current block is split into Type_3 of FIG. 8; and, if the current block is in diagonal mode, the current block is split into Type_5 of FIG. 8. In these split types, the current block is split into a first subblock that is in relatively short distance from the reference samples used in the corresponding intra-prediction mode and a second subblock that is relatively far therefrom.

Among the allowed split types for the current block, the split type to be applied to the current block may be determined (or derived) by the video encoder and video decoder based on the prediction modes of the already reconstructed neighboring blocks adjacent to the current block.

Figure 10:
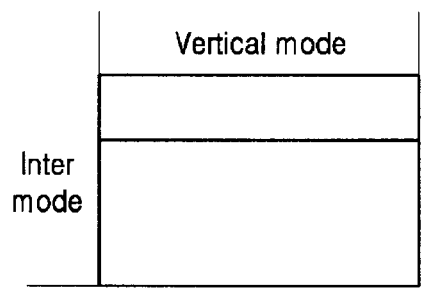
FIG. 10 illustrates some examples in which the split types to be applied to a given block coded in a weighted-sum prediction mode are derived based on the prediction modes of neighboring blocks, according to at least one aspect of the present disclosure.
Figure 10:
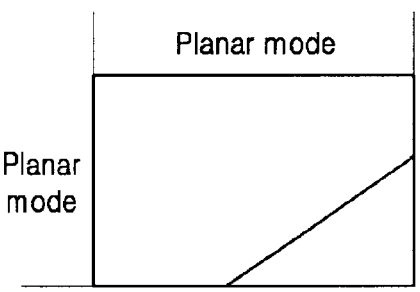
Figure 10:
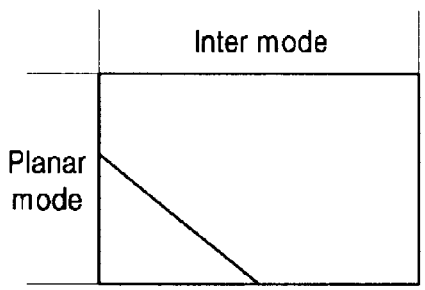
Figure 10:
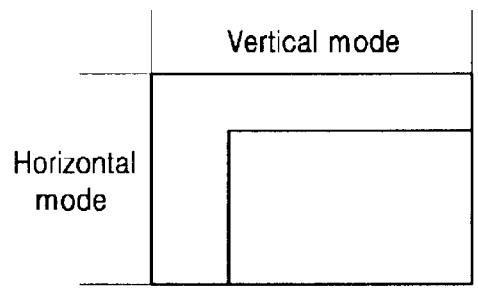

FIG. 10 illustrates some examples in which the split types to be applied to a given block coded in a weighted-sum prediction mode are derived based on the prediction modes of neighboring blocks, according to at least one aspect of the present disclosure. As shown in (a) of FIG. 10, if the top neighboring block of a given block is in vertical intra-prediction mode (mode 50 of FIG. 2A) and the left neighboring block of the given block is coded in inter-prediction mode, it can be inferred that the given block is split into two subblocks in the horizontal direction (i.e., split into Type_3 of FIG. 8). In a similar way, if the top neighboring block of a given block is in inter mode and the left neighboring block of a given block is in horizontal intra-prediction mode, it can be inferred that the given block is split into two subblocks in the vertical direction (i.e., split into Type_2 in FIG. 8). FIG. 10 shows, at (b), (c), and (d), examples of inferring that the given block is split into Type_5, Type_9, and Type_1 of FIG. 8, respectively.

As part of coding the current block in weighted-sum prediction mode, the video encoder and decoder may first determine a list of split types that need to be utilized for the current block. Thereafter, a split type index for the current block may be coded to indicate which entry in the split type list needs to be utilized to predict the pixels (samples) of the current block.

The number of entries (K) constituting the split type list may be less than or equal to the total number of split types (L) available in weighted-sum prediction mode, where the number of entries (K) is a predefined value between the video encoder and the video decoder. To construct the entries in the split type list, K split types may be selected from the total available split types in the order of their probability of being priorly applied to the current block, based on the information of the neighboring blocks of the current block.

Figure 11:
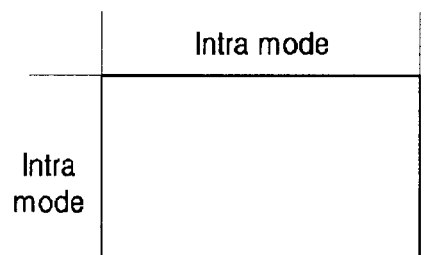
FIG. 11 illustrates a prediction mode of the neighboring blocks of the given block and a list of split types with four entries constructed for the given block, according to at least one aspect of the present disclosure.
Figure 11:
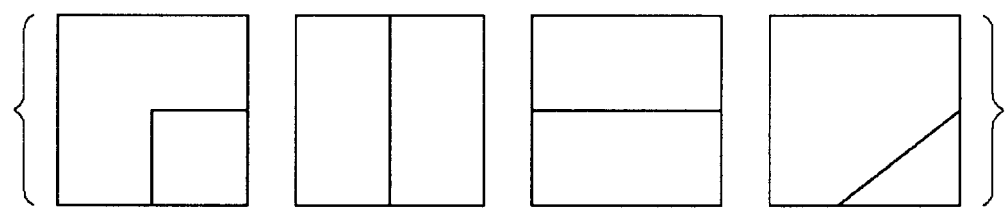

FIG. 11 illustrates a list of split types with four entries constructed for a given block, according to at least one aspect of the present disclosure. Referring to (a) of FIG. 11, since the neighboring blocks are all coded in intra mode, when generating a weighted-sum prediction signal for a given block, a larger weight for the intra-prediction signal than the inter-prediction signal can improve the prediction accuracy. The list of split types is composed of split types suitable when the intra-prediction modes to be used to generate the intra-prediction signal is Planar, Horizontal, Vertical, and Diagonal, respectively. In these split types, a given block is split into a first subblock that is in relatively short distance from the reference samples used in the corresponding intra-prediction mode and a second subblock that is relatively far therefrom.

The video decoder may derive the split type selected by the video encoder for the current block by parsing, from the bitstream, index information pointing to one entry in the list of split types. With the split type list shown in (b) of FIG. 11, the video decoder may parse a 2-bit syntax element from the bitstream to determine one of the four split types in the split type list.

In some embodiments presenting neighboring blocks already coded in weighted-sum prediction mode, the split type information of that neighboring block may be referenced to efficiently signal the index of the current blocks split type. For example, the video encoder may traverse the already encoded neighboring blocks in a predefined order. When the video encoder first encounters a neighboring block coded in weighted-sum prediction mode, the video encoder may calculate the difference between the index of the split type of the neighboring block and the index of the current block and may encode the value and sign of the difference.

Figure 12:
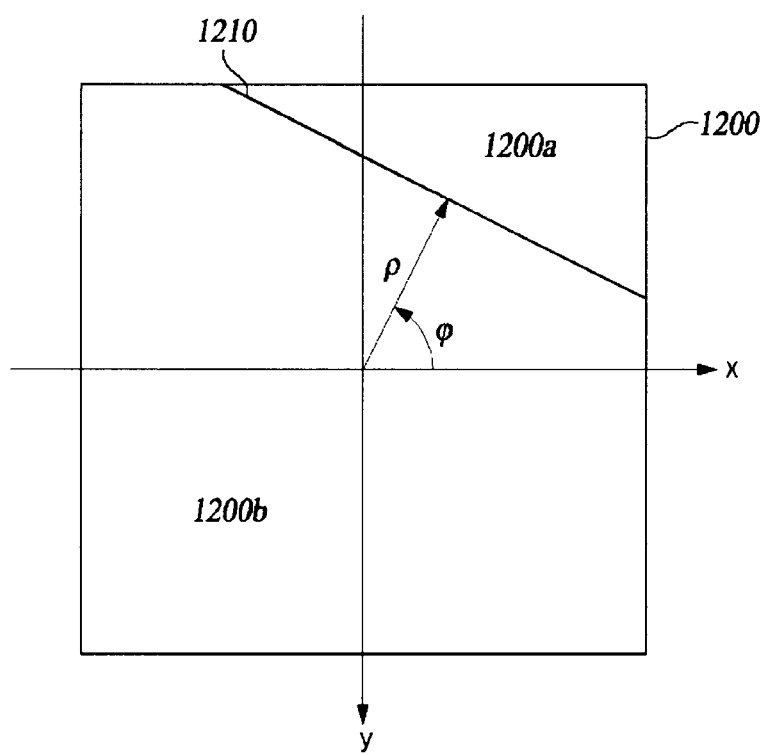
FIG. 12 illustrates a geometric split type of a block that may be utilized in a weighted-sum prediction mode, according to at least one aspect of the present disclosure.

FIG. 12 illustrates a geometric split type of a block that may be utilized in a weighted-sum prediction mode, according to at least one aspect of the present disclosure.

Figure 13:
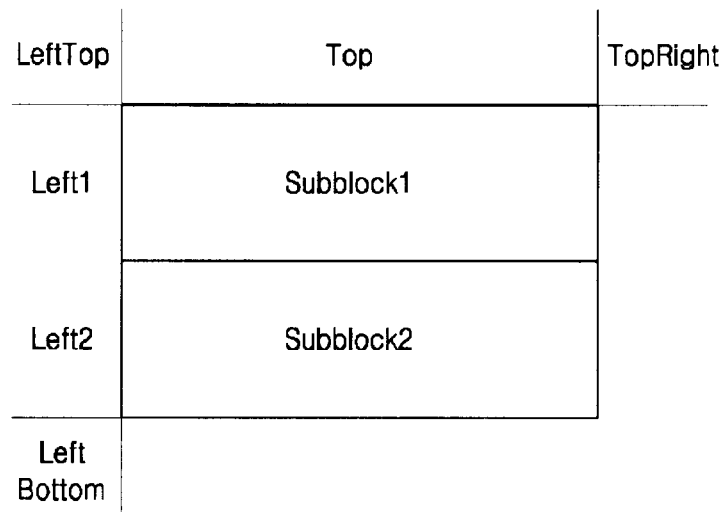
FIG. 13 illustrates a current block coded in a weighted-sum prediction mode with Type_3 applied as the split type, and the neighboring blocks of the current block, in accordance with at least one aspect of the present disclosure.

A block 1200 coded using the weighted-sum prediction mode may be split into two parts (i.e., two subblocks; 1200a and 1200b) by a straight line partition boundary 1210. As illustrated in FIG. 13, the position of the straight-line partition boundary 1210 may be mathematically defined by an angle parameter and an offset parameter. The angle parameter ($\varphi$) is defined as the angle in the counterclockwise direction from the x-axis to the normal vector of the straight partition boundary 1210. The offset parameter ($\rho$) is defined as the displacement of the partition boundary 1210 from an origin defined at the center of the given block 1200. The parameters of the geometric split type may be identified by a geometric split type index in a predefined lookup table. The indexes indicating the geometric split type (i.e., angle parameters and offset parameters) selected for the current block may be explicitly signaled in the bitstream by the video encoder. The video decoder may derive the geometric split type selected by the video encoder for the current block by parsing, from the bitstream, a syntax element that indicates an index pointing to one entry in the lookup table.

Deriving Weight Information (S630)

The video decoder may determine for each subblock of the current block a pair of weights to be used to generate the weighted-sum prediction signal.

In some embodiments, the pair of weights for each subblock may be derived from the split type of the current block, the relative position of the subblock within the current block, and/or decoded information of neighboring blocks of the current block adjacent to each subblock. The decoded information of the neighboring blocks may include information related to the prediction of the neighboring blocks, such as whether the neighboring blocks are inter- or intra-prediction blocks, whether the inter-prediction is bidirectional or unidirectional, and whether the intra-prediction mode is directional or non-directional.

FIG. 13 illustrates a current block coded in a weighted-sum prediction mode, and the neighboring blocks of the current block, in accordance with at least one aspect of the present disclosure.

In FIG. 13, the method of the present disclosure may derive the pair of weights for the first subblock of the current block based at least in part on the decoded information of the neighboring blocks {Left1, LeftTop, Top, TopRight} and may derive the weight value for the second subblock of the current block based at least in part on the decoded information of the neighboring blocks {Left1, Left2, LeftBottom}.

In one example, for some combination cases of the prediction modes (inter or intra) of the neighboring blocks {Left1, Left2, LeftBottom}, the video encoder and the video decoder may set the values of the pair of weights of subblock 2 as follows.

(Intra, Intra, Intra)→$w_{inter}$=0.2, $w_{intra}$=0.8
(Inter, Intra, Intra)→$w_{inter}$=0.4, $w_{intra}$=0.6
(Inter, Inter, Intra)→$w_{inter}$=0.6, $w_{intra}$=0.4
(Inter, Inter, Inter)→$w_{inter}$=0.8, $w_{intra}$=0.2

In the above example, whether the inter prediction is bidirectional may be further considered as follows.

(Inter, Inter, Intra), Bidirectional→$w_{inter}$=0.6, $w_{intra}$=0.4
(Inter, Inter, Intra), Unidirectional→$w_{inter}$=0.7, $w_{intra}$=0.3

Figure 14:
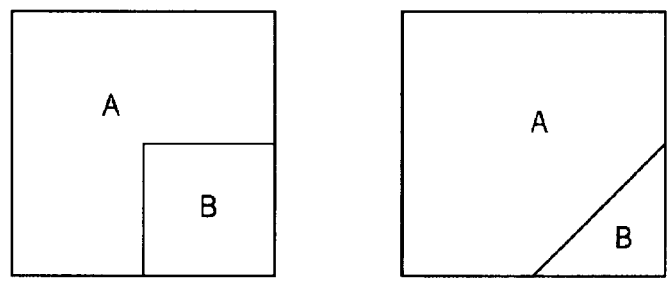
FIG. 14 illustrates relative subblock positions within the current block considered for determining weights, according to at least one aspect of the present disclosure.

Additionally, in establishing the pair of weights for each subblock, the relative position of the subblock within the current block may be further considered. For example, with the split types (Type_1, Type_5) illustrated in FIG. 14, the current block is split into a first subblock covering positions (xCb, yCb) of the upper left sample of the current block and a second subblock covering positions (xCb+cbWidth−1, yCb+cbHeight−1)) of the lower right sample of the current block. Here, cbWidth and cbHeight are the width and height of the current block, respectively.

The second subblock B in the current block is relatively far away from the reference samples used to generate the intra-prediction signal compared to the first subblock A. As a result, the intra-prediction for the second subblock B may be less accurate than the intra-prediction for the first subblock A. The intra-prediction for the second subblock B may be less accurate than the intra-prediction signal. Therefore, the weight value ($w_{intra}$) assigned to the intra-prediction signal may be smaller in the case of the second subblock (B) than in the case of the first subblock (A), as shown in the example below. Conversely, the weight value ($w_{intra}$) assigned to the inter-prediction signal may be larger in the case of the second subblock (B) than in the case of the first subblock (A), as shown in the example below.

(Intra, Intra, Intra), for sunblock A→$w_{intra}^{a}$=0.8, $w_{inter}^{a}$=0.2

(Intra, Intra, Intra), for sunblock B→$w_{inter}^{b}$=0.6, $w_{inter}^{a}$=0.4

Figure 15:
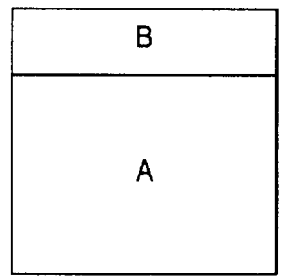
FIG. 15 illustrates the relative sizes of subblocks considered for determining weights, according to at least one aspect of the present disclosure.
Figure 15:
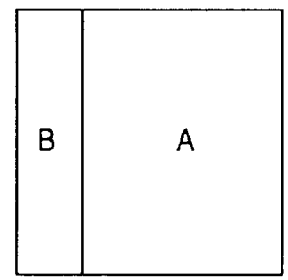
Figure 15:
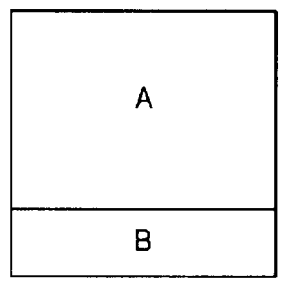
Figure 15:
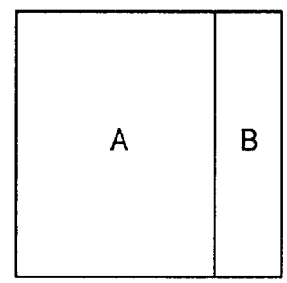

Additionally, the relative sizes of the subblocks within the current block may be further considered in establishing the pair of weights for the respective subblocks. For example, with the split types illustrated in FIG. 15, the first subblock A in the current block has a larger size than the second subblock B. For example, selecting such split type as in (a) of FIG. 15 for the current block may be advantageous when a new object happened to appear in the top neighboring block of the current block, i.e., when a new object appears in the top neighboring block of the current block albeit the new object was absent from the co-located block of the previous picture corresponding to the top neighboring block of the current block. With such a split type, to reduce an occlusion error that may occur in the inter prediction, the weight value ($w_{inter}$) assigned to the inter-prediction signal may be set smaller for the first sub-block (A), which is closer to the neighboring block where the new object appeared, than for the second sub-block (B). Conversely, the weight value ultra ($w_{intra}$) assigned to the intra-prediction signal may be larger for the second subblock (B) than for the first subblock (A).

In some other embodiments, information indicating the pair of weight values selected for each subblock (e.g., an index of the pair of weight values selected for the subblocks) may be explicitly signaled in the bitstream by the video encoder. The video encoder and video decoder may have a list of predefined weights for them to use in weighted-sum prediction mode. Table 1 shows a weight list that may be used in weighted-sum prediction mode according to at least one aspect of the present disclosure. In the weight list, paired weight values to be assigned to an intra-prediction signal and an inter-prediction signal are identified by indices. In Table 1, the sum of paired weight values is 1.

TABLE 1

Weight List

| Index | Weight values |
|---|---|
| 0 | $(w_0, 1 - w_0)$ |
| 1 | $(w_1, 1 - w_1)$ |
| ... | ... |
| k | $(w_k, 1 - w_k)$ |

When the current block coded in weighted-sum prediction mode is split into n subblocks, n indices may be coded for the current block, which associates each subblock with a pair of weight values in the weight list. For example, when the current block is split into two subblocks, two indices are coded for the current block, which associate each subblock with a pair of weight values in the weight list. In other words, an index is coded for the first subblock of the current block, and another index is coded for the second subblock of the current block.

For efficient signaling of the indices, after coding the index for the first subblock, the indices for the respective remaining subblocks may be coded by their difference values and signs from the index for the first subblock.

Alternatively, the indices of some subblocks of the current block may be explicitly coded, while the indices of the remaining subblocks may be derived from decoded information of neighboring blocks of the current block, adjacent to each subblock. As illustrated in FIG. 16, for example, in a block with split type Type_6 applied, the index of the first subblock located in the upper left corner may be derived from decoded information (e.g., prediction mode) of the neighboring blocks (Top1, LeftTop, Left2) of the current block, adjacent to the first subblock, while the index of the second subblock may be explicitly coded.

In the example of FIG. 16, the index of the second subblock may not be explicitly coded but be implicitly derived from the derived index of the first subblock. Thus, for the block of FIG. 16, no index may be coded for any subblock. For example, when $(w_{Intra}^a, w_{Inter}^a)$ represents a pair of weights of the first subblock that are indicated by the induced indices in the first subblock, the weights in the second subblock may be derived as $w_{Intra}^b = w_{Intra}^a - 0.2$ and $w_{Inter}^b = w_{Inter}^a + 0.2$. In other words, to keep the weighted-sum prediction signal in the second subblock from being less influenced by the intra-prediction signal compared to the first subblock, the weights in the second subblock may be derived from the weights of the first subblock.

Generating Intra-Prediction Signal and Inter-Prediction Signal (S640)

The video encoder and video decoder may generate an intra-prediction signal for the current block or each subblock of the current block and may generate an inter-prediction signal for the current block.

When generating the inter-prediction signal for the current block, the merge mode may be used, which is a method of utilizing the motion vector information of neighboring blocks. Inter prediction may include both unidirectional prediction and bidirectional prediction. The inter-prediction signal of the current block may be generated for each prediction block. For example, the inter-prediction signals for the first subblock and the second subblock are generated in a single process using the same motion information, e.g., the motion vectors of neighboring blocks as indicated by the merge index signaled for the current block.

In generating the intra-prediction signal, a preset mode, e.g., PLANAR mode may be used regardless of the intra-prediction mode of the neighboring blocks adjacent to the current block. Alternatively, for a current block coded in weighted-sum prediction mode, an intra-prediction mode (e.g., one of the modes illustrated in FIG. 3A) used to generate the intra-prediction signal may be signaled in the bitstream by the video encoder.

Figure 17:
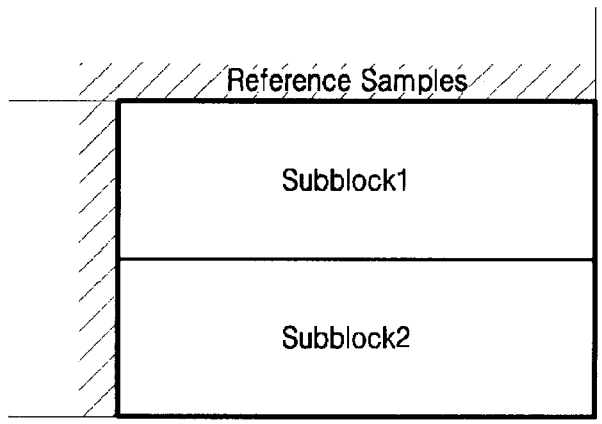
FIG. 17 illustrates reference samples used to generate an intra-prediction signal for a block coded in a weighted-sum prediction mode, according to at least one aspect of the present disclosure.
Figure 17:
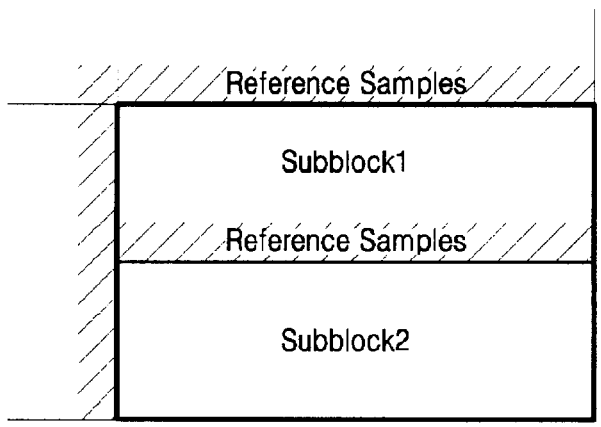

For a given block, the present disclosure may consider generating an intra-prediction signal for each prediction block or each subblock. FIG. 17 illustrates reference samples used to generate an intra-prediction signal for a block coded in a weighted-sum prediction mode. The split type of the exemplified block is Type_3, in which the block is split horizontally into two subblocks, i.e., an upper subblock and a lower subblock.

In the example shown in (a) of FIG. 17, the intra-prediction signal is generated for each prediction block that includes both the first subblock and the second subblock. Here, the intra-prediction signals for the first subblock and the second subblock are generated in a single process using a single intra-prediction mode.

In the example shown in (b) of FIG. 17, the intra-prediction signals are generated subblockwise, where the intra-prediction signal for the first subblock is generated with reference to the neighboring samples of the given block, and the intra-prediction signal for the second subblock is generated with reference to the reconstructed samples of the first subblock as well as the reconstructed samples of the block to the left of the given block. Thus, in the example shown in (b) of FIG. 17, the first subblock is reconstructed, and then the intra-prediction signal for the second subblock is generated. Here, the same intra-prediction mode may be used for the first subblock and the second subblock, or different intra-prediction modes may be used for the first subblock and the second subblock. The example shown in (b) of FIG. 17 may increase the prediction accuracy of the intra-prediction signal for the second subblock compared to the example shown at (a), as the subblocks can refer to closely neighboring samples.

Similarly, in the case of Type_2, where a given block is split in the vertical direction into two subblocks, i.e., a left subblock and a right subblock, the right subblock may be generated by referring to the reconstructed samples of the left subblock as well as the reconstructed samples of the upper blocks of the given block.

For a given block, the video encoder may select whether to generate the intra-prediction signal for each prediction block or each subblock, and the video encoder may signal the selection to the video decoder by using a 1-bit flag.

Generating Weighted-Sum Prediction Signal (S650)

Referring again to FIG. 7, a process is schematically illustrated for generating a weighted-sum prediction signal for a given block coded in weighted-sum prediction mode. In FIG. 7, the given block is split horizontally into two subblocks. The video encoder and video decoder can generate, for the intra-prediction signal ($P_{intra}$) and inter-prediction signal ($P_{inter}$), a weighted-sum prediction signal (PCIIP) for each subblock of the current block with different pairs of weights applied per subblock. Where a given block coded in weighted-sum prediction mode is split into multiple subblocks, the weighted-sum prediction signal (PCIIP) for each subblock may be generated as shown in Equation 2.

$$P_{CIIP}^i = (1-w^i) * P_{intra}^i + w^i * P_{inter}^i \qquad \text{Equation 2}$$

In Equation 2, $(1-w^i)$ and $w^i$ are the weight given to the intra-prediction signal and the weight given to the inter-prediction signal, respectively, for the i-th subblock.

The video encoder may generate a residual block for the current block from the original samples of the current block and the weighted-sum prediction signal (i.e., the prediction block) and may encode the residual block into a bitstream after transform and/or quantization. The video decoder may reconstruct the residual block of the current block from the bitstream and may generate a reconstruction block of the current block from the residual block and the weighted-sum prediction signal.

It should be understood that the above description presents illustrative embodiments that may be implemented in various other manners. The functions described in some embodiments may be realized by hardware, software, firmware, and/or their combination. The functional components described in the present disclosure have been labeled as units in order to more particularly emphasize their potential independent implementation.

Meanwhile, various methods or functions described in the present disclosure may be implemented with instructions stored in a non-transitory recording medium, which may be read and executed by one or more processors. The non-transitory recording medium includes, for example, all types of recording devices in which data is stored in a form readable by a computer system. For example, the non-transitory recording medium includes storage media, such as an erasable and programmable read only memory (EPROM), an electrically erasable and programmable read-only memory (EEPROM), a flash drive, an optical drive, a magnetic hard drive, and a solid state drive (SSD).

Although embodiments have been described for illustrative purposes, those having ordinary skill in the art should appreciate that and various modifications and changes are possible, without departing from the idea and scope of the embodiments. Embodiments have been described for the sake of brevity and clarity. Accordingly, one of ordinary skill should understand that the scope of the embodiments is not limited by the embodiments explicitly described above but is inclusive of the claims and equivalents thereto.

What is claimed is:

1. A method of encoding video data, the method comprising:
   determining that a current block of the video data is to be encoded in a weighted-sum prediction mode;
   splitting the current block into two or more subblocks;
   determining, for each of the subblocks, a weight set comprising a first weight for an intra-prediction signal of the current block and a second weight for an inter-prediction signal of the current block, the subblocks having different weight sets; and
   determining a prediction block of the current block based on a weighted-sum of the intra-prediction signal and the inter-prediction signal, the weighted-sum being dependent on the weight set that is determined for each of the subblocks,
   wherein the subblocks include a first subblock covering a top left sample of the current block and include a second subblock covering a bottom right sample of the current block, and
   wherein the first weight for the first subblock is greater than the first weight for the second subblock, and the second weight for the first subblock is less than the second weight for the second subblock.

2. The method of claim 1, wherein the splitting of the current block into two or more subblocks comprises:
   determining, from a plurality of available split types, a split type to be applied to the current block.

3. The method of claim 2, wherein the split type applied to the current block is selected based on coding information of one or more neighboring blocks of the current block.

4. The method of claim 2, wherein the available split types comprise:
   geometric splits in which a given block is split into two subblocks by a straight partition boundary.

5. The method of claim 1, wherein the splitting of the current block into two or more subblocks comprises:
   encoding a syntax element indicating a split type to be applied to the current block among a plurality of available split types.

6. The method of claim 1, wherein a split type applied to the current block is inferred from an intra-prediction mode of the current block, which is used to generate the intra-prediction signal.

7. The method of claim 1, wherein the determining of the weight set comprises:
   determining the weight set based on a split type of the current block and coding information of one or more neighboring blocks adjacent to the current block.

8. The method of claim 1, further comprising:
   encoding, for each of the subblocks, a syntax element indicating the weight set from a list of a plurality of available weight sets.

9. The method of claim 1, wherein:
   the current block is split in a vertical direction or a horizontal direction into two subblocks, from which intra-prediction signals are all generated in an intra-prediction mode of the current block; and
   the two subblocks include a left or upper subblock that is predicted from reconstructed samples of neighboring blocks adjacent to the current block and a right or lower subblock that is predicted from reconstructed samples of neighboring blocks adjacent to the current block and reconstructed samples of the left or upper subblock.

10. A method of decoding video data, the method comprising:
    determining that a current block of the video data is to be decoded in a weighted-sum prediction mode;
    splitting the current block into two or more subblocks;
    determining, for each of the subblocks, a weight set comprising a first weight for an intra-prediction signal of the current block and a second weight for an inter-prediction signal of the current block, the subblocks having different weight sets; and
    determining a prediction block of the current block based on a weighted-sum of the intra-prediction signal and the inter-prediction signal, the weighted-sum being dependent on the weight set that is determined for each of the subblocks,
    wherein the subblocks include a first subblock covering a top left sample of the current block and include a second subblock covering a bottom right sample of the current block, and
    wherein the first weight for the first subblock is greater than the first weight for the second subblock, and the second weight for the first subblock is less than the second weight for the second subblock.

11. The method of claim 10, wherein the splitting of the current block into two or more subblocks comprises:
    determining, from a plurality of available split types, a split type to be applied to the current block.

12. The method of claim 11, wherein the split type applied to the current block is selected based on coding information of one or more neighboring blocks adjacent to the current block.

13. The method of claim 10, wherein the splitting of the current block into two or more subblocks comprises:
  encoding a syntax element indicating a split type to be applied to the current block among a plurality of available split types.

14. The method of claim 10, wherein a split type applied to the current block is inferred from an intra-prediction mode of the current block, which is used to generate the intra-prediction signal.

15. The method of claim 10, wherein the determining of the weight set comprises:
  determining the weight set based on a split type of the current block and coding information of one or more neighboring blocks of the current block.

16. The method of claim 10, further comprising:
  encoding, for each of the subblocks and from a bitstream, a syntax element indicating the weight set from a list of a plurality of available weight sets.

17. The method of claim 10, wherein:
  the current block is split in a vertical direction or a horizontal direction into two subblocks, from which intra-prediction signals are all generated in an intra-prediction mode of the current block; and
  the two subblocks include a left or upper subblock that is predicted from reconstructed samples of neighboring blocks adjacent to the current block and a right or lower subblock that is predicted from reconstructed samples of neighboring blocks adjacent to the current block and reconstructed samples of the left or upper subblock.

18. A method for providing a video decoding apparatus with video data, the method comprising:
  encoding the video data into a bitstream; and
  transmitting the bitstream to the video decoding apparatus,
  wherein encoding the video data comprises:
    determining that a current block of the video data is to be encoded in a weighted-sum prediction mode;
    splitting the current block into two or more subblocks;
    determining, for each of the subblocks, a weight set comprising a first weight for an intra-prediction signal of the current block and a second weight for an inter-prediction signal of the current block, the subblocks having different weight sets; and
    determining a prediction block of the current block based on a weighted-sum of the intra-prediction signal and the inter-prediction signal, the weighted-sum being dependent on the weight set that is determined for each of the subblocks,
  wherein the subblocks include a first subblock covering a top left sample of the current block and include a second subblock covering a bottom right sample of the current block, and
  wherein the first weight for the first subblock is greater than the first weight for the second subblock, and the second weight for the first subblock is less than the second weight for the second subblock.

* * * * *